(12) United States Patent
Han (10) Patent No.: US 11,783,734 B2
(45) Date of Patent: Oct. 10, 2023

(54) FOLDABLE DISPLAY DEVICE

(71) Applicant: Wuhan China Star Optoelectronics Semiconductor Display Technology Co., Ltd., Hubei (CN)

(72) Inventor: Wen Han, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 510 days.

(21) Appl. No.: 16/966,642

(22) PCT Filed: Jun. 23, 2020

(86) PCT No.: PCT/CN2020/097697
§ 371 (c)(1),
(2) Date: Jul. 31, 2020

(87) PCT Pub. No.: WO2021/237845
PCT Pub. Date: Dec. 2, 2021

(65) Prior Publication Data
US 2023/0087236 A1 Mar. 23, 2023

(30) Foreign Application Priority Data
May 26, 2020 (CN) .......................... 202010454253.1

(51) Int. Cl.
*G06F 3/041* (2006.01)
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC .... G06F 1/1652; G06F 1/1616; G06F 1/1656; G06F 1/1681; G09F 9/301; G09G 2380/02; H01L 2251/5338
See application file for complete search history.

(56) References Cited

U.S. PATENT DOCUMENTS 10,368,452 B2 * 7/2019 Yun ....................... H10K 77/111
10,469,635 B1 * 11/2019 Carlson ................. G06F 1/1652
(Continued)

FOREIGN PATENT DOCUMENTS

CN      106486018 A      3/2017
CN      107731100 A      2/2018
(Continued)

OTHER PUBLICATIONS

International Search Report in International application No. PCT/CN2020/097697, dated Mar. 2, 2021.
(Continued)

*Primary Examiner* — Joe H Cheng
(74) *Attorney, Agent, or Firm* — PV IP PC; Zhigang Ma; Wei Te Chung (57) ABSTRACT

A foldable display device is provided and includes: a first housing, a second housing rotatably connected to the first housing, a flexible display module, and a rigid foldable functional layer. A side of the flexible display module is disposed on the first housing and the second housing, and the rigid foldable functional layer is disposed on another side of the flexible display module. Furthermore, the rigid foldable functional layer is disposed on a light-emitting side of the flexible display module.

20 Claims, 7 Drawing Sheets

(56) References Cited

U.S. PATENT DOCUMENTS

| | | | | |
|---|---|---|---|---|
| 2016/0295709 A1* | 10/2016 | Ahn | .................. | G06F 1/1652 |
| 2017/0365197 A1* | 12/2017 | Kim | .................. | G06F 1/1641 |
| 2017/0374749 A1* | 12/2017 | Lee | .................. | H05K 5/0017 |
| 2018/0150108 A1* | 5/2018 | Song | .................. | H05K 1/028 |
| 2018/0217639 A1* | 8/2018 | Jones | .................. | G06F 1/1626 |
| 2019/0011954 A1* | 1/2019 | Chu | .................. | G09F 9/301 |
| 2019/0353540 A1* | 11/2019 | Hong | .................. | G06F 1/1652 |
| 2020/0068725 A1* | 2/2020 | Park | .................. | H05K 5/0017 |
| 2020/0234616 A1* | 7/2020 | Ha | .................. | H01L 51/0097 |
| 2021/0132662 A1* | 5/2021 | Cavallaro | .................. | G06F 1/1643 |
| 2021/0136933 A1* | 5/2021 | Smeeton | .................. | B32B 15/09 |

FOREIGN PATENT DOCUMENTS

| | | | |
|---|---|---|---|
| CN | 209765932 U | 12/2019 | |
| CN | 110853506 A | 2/2020 | |
| CN | 110853525 A | 2/2020 | |

OTHER PUBLICATIONS

Written Opinion of the International Search Authority in International application No. PCT/CN2020/097697, dated Mar. 2, 2021.
Indian Office Action issued in corresponding Indian Patent Application No. 202147015083 dated Mar. 8, 2023, pp. 1-6.

\* cited by examiner

FOLDABLE DISPLAY DEVICE

RELATED APPLICATIONS

This application is a National Phase of PCT Patent Application No. PCT/CN2020/097697 having International filing date of Jun. 23, 2020, which claims the benefit of priority of Chinese Patent Application No. 202010454253.1 filed on May 26, 2020. The contents of the above applications are all incorporated by reference as if fully set forth herein in their entirety.

FIELD AND BACKGROUND OF THE INVENTION

The present disclosure relates to the field of display technologies, and more particularly, relates to a foldable display device.

Flexible display devices have become increasingly popular in market. Compared with conventional screens, flexible screens, which are bendable and have great flexibility, used in mobile phones have apparent merits such as thinner and lighter body, and lower power consumption. Therefore, battery durability of devices with the flexible screens can be improved. Furthermore, due to exceptional bendability and flexibility, endurance of the flexible screens is much higher than that of the conventional screens, which reduces possibility of devices with the flexible screens being accidentally damaged.

Figure 1:
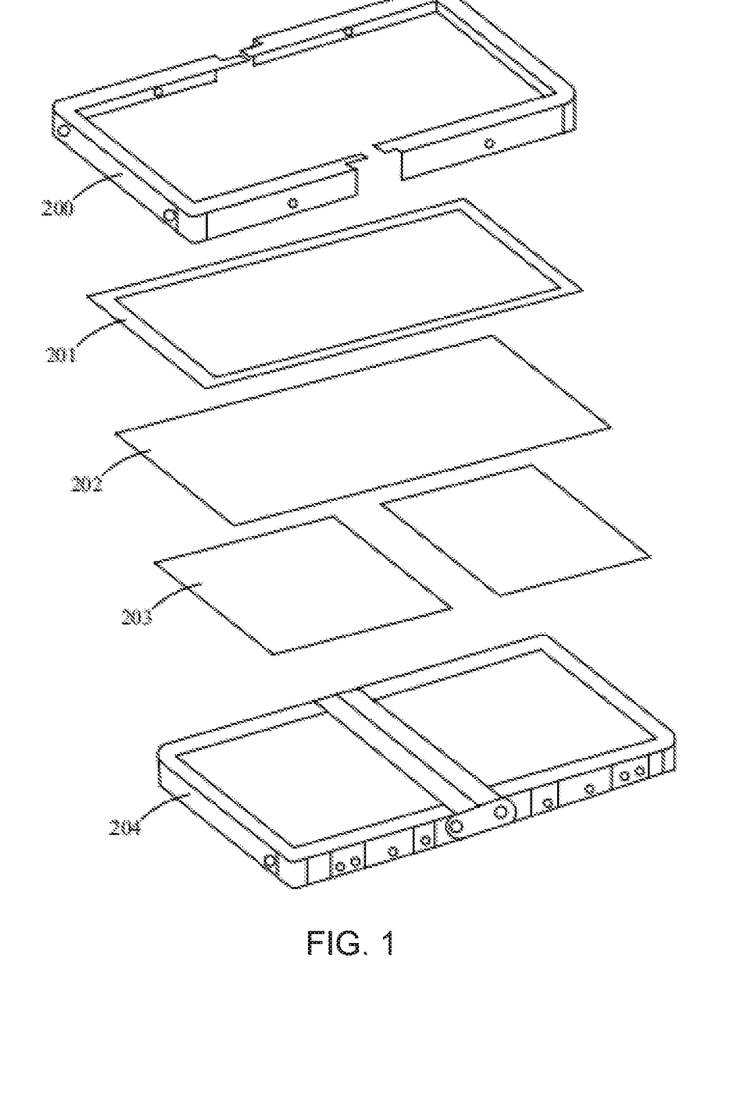
FIG. 1 is a schematic exploded view showing a conventional flexible display device.

As shown in FIG. 1, a schematic exploded view of a conventional flexible display device is provided. The conventional flexible display device includes a front frame 200, a flexible display panel 201, a metal sheet 202, a plurality of support plates 203, and a middle frame component 204. The metal sheet is disposed on an entire bottom surface of the conventional flexible display panel to alleviate impacts caused by waviness and folds. The support plates are distributed only in a non-bending area and are strong enough to support the conventional flexible display panel, which allows the entire device to be assembled easily. However, because the support plates separated crossing a bending area are relatively thick (about 0.3 mm), a height difference appears in the bending area in a middle portion of the device. Therefore, flatness of the entire device cannot be ensured. In addition, an edge of a conventional flexible display panel is covered by a front frame or some decorative strips, so that a top surface of the front frame and a top surface of the display panel are not at a same plane, which forms a height difference that leads to bad touch experience and a non-aesthetically pleasing appearance of flexible display devices.

Therefore, it is necessary to provide a technical solution to solve a following problem: a support plate disposed in a non-bending area and a front disposed at an edge of a flexible display panel result in uneven flatness of flexible display devices.

SUMMARY OF THE INVENTION

An objective of the present disclosure is to provide a foldable display device with great flatness and good appearance.

To achieve the above goal, the present disclosure provides a foldable display device, including: a first housing, a second housing rotatably connected to the first housing, a flexible display module, and a rigid foldable functional layer. A side of the flexible display module is disposed on the first housing and the second housing, and the rigid foldable functional layer is disposed on another side, which is a light-emitting side, of the flexible display module.

In the above foldable display device, the rigid foldable functional layer is an extremely thin glass with a thickness ranging from 10 μm to 300 μm.

In the above foldable display device, the foldable display device includes a first non-bending area, a second non-bending area, and a bending area between the first non-bending area and the second non-bending area, the first housing and the second housing each include a containing chamber, a portion of the flexible display module corresponding to the first non-bending area is disposed in the containing chamber of the first housing, a portion of the flexible display module corresponding to the second non-bending area is disposed in the containing chamber of the second housing, and a portion of the flexible display module corresponding to the bending area is connected between the portion of the flexible display module corresponding to the first non-bending area and the portion of the flexible display module corresponding to the second non-bending area.

In the above foldable display device, the foldable display device further includes a frame-shaped connecting component including a frame-shaped part and an opening defined in the frame-shaped part, a surface of the frame-shaped part is connected to the first housing and the second housing, another surface of the frame-shaped part is connected to the rigid foldable functional layer, the opening of the frame-shaped connecting component is correspondingly disposed to the flexible display module, and the surface of the frame-shaped part corresponds to another surface of the frame-shaped part.

In the above foldable display device, the foldable display device includes a first non-bending area, a second non-bending area, and a bending area disposed between the first non-bending area and the second non-bending area, the frame-shaped connecting component includes a first area and a second area, the first area of the frame-shaped connecting component corresponds to the bending area, the second area of the frame-shaped connecting component corresponds to the first non-bending area and the second non-bending area, a portion of the frame-shaped connecting component corresponding to the second area is attached to the first housing and the second housing, and an elastic modulus of the frame-shaped connecting component in the first area is less than an elastic modulus of the frame-shaped connecting component in the second area.

In the above foldable display device, the elastic modulus of the frame-shaped connecting component in the first area ranges from 1 MPa to 100 MPa, and the elastic modulus of the frame-shaped connecting component in the second area is greater than 150 GPa In the above foldable display device, a plurality of recesses, which are spaced apart from each other and are alternately arranged are defined on the first frame-shaped connecting component in the first area.

In the above foldable display device, the recesses, which are spaced apart from each other and are alternately arranged, are symmetrically disposed with respect to a bending central axis of the foldable display device, and a size of each of the recesses along a width direction of the frame-shaped part of the frame-shaped connecting component is greater than a size of each of same recesses along a length direction of the frame-shaped part of the frame-shaped connecting component.

In the above foldable display device, a depth of the recesses is less than or equal to a thickness of the frame-shaped connecting component.

In the above foldable display device, a depth of the recesses is less than a thickness of the frame-shaped connecting component, and an elastic rubber is filled in the recesses.

In the above foldable display device, a width of the frame-shaped part of the frame-shaped connecting component is equal to one half of a difference between a width of the rigid foldable functional layer and a width of the flexible display module, and the width of the rigid foldable functional layer is greater than the width of the flexible display module.

In the above foldable display device, an outer edge of the frame-shaped connecting component is aligned with an outer edge of the rigid foldable functional layer, an outer edge of the first housing, and an outer edge of the second housing.

In the above foldable display device, a material of the frame-shaped connecting component includes at least one of stainless steel, an amorphous material, a nickel-copper alloy, or an aluminum alloy.

In the above foldable display device, a size of the opening is greater than or equal to a size of the flexible display module.

In the above foldable display device, a width of the frame-shaped connecting component is greater than or equal to a width of a side plate of the first housing and a width of a side plate of the second housing.

In the above foldable display device, the foldable display device further includes a protective film disposed on a side of the rigid foldable functional layer away from the flexible display module, and a thickness of the protective film ranges from 5 μm to 30 μm.

In the above foldable display device, a material of the protective film includes at least one of polyimide or polyethylene terephthalate.

In the above foldable display device, the thickness of the protective film ranges from 10 μm to 25 μm.

In the above foldable display device, a portion of the rigid foldable functional layer corresponding to the flexible display module is connected to the flexible display module by an optically clear adhesive layer, a width of the rigid foldable functional layer is greater than a width of the flexible display module, and a length of the rigid foldable functional layer is greater than a length of the flexible display module.

In the above foldable display device, a Young's modulus of the rigid foldable functional layer ranges from 50 GPa to 100 GPa, and a hardness of the rigid foldable functional layer ranges from 5 GPa to 15 GPa.

Regarding the beneficial effects: compared with conventional technologies, a front frame and a support plate are omitted in a foldable display device provided by the present disclosure. A rigid foldable functional layer is disposed at a light-emitting side of a foldable display module and is attached to a housing. The rigid foldable functional layer not only can rigidly support the foldable display device, but also can decorate the light-emitting side of the foldable display device. Because folds will not appear on the bent rigid foldable functional layer, an uneven flatness of the foldable display device can be prevented. Furthermore, the rigid foldable functional layer has a hard and strong surface with great friction resistance, which solves a problem of conventional colorless polyimide cover plates having low hardness and low friction resistance surfaces. The foldable display device can almost satisfy standard requirements of conventional rigid display devices and can more suitably meet user application requirements for terminals.

Furthermore, the rigid foldable functional layer is connected to the housing by a frame-shaped connecting component. The frame-shaped connecting component, the housing, and the rigid foldable functional layer have rigidity and match with each other, thereby preventing cracking of the rigid foldable functional layer directly attached to the housing. Moreover, by attaching the rigid foldable functional layer to the frame-shaped connecting component, the flexible display module can be easily assembled, changed, and repaired.

Furthermore, a protective film is disposed on a surface of the rigid foldable functional layer away from the flexible display module. The protective film not only can prevent an explosion of the rigid foldable functional layer, but also can be an outer screen that is easily disassembled. Furthermore, compared with conventional colorless polyimide, the protective film is relatively thin, so that apparent folds will not appear.

DESCRIPTION OF SPECIFIC EMBODIMENTS OF THE INVENTION

Hereinafter a preferred embodiment of the present disclosure will be described with reference to the accompanying drawings to exemplify the embodiments of the present disclosure can be implemented, which can fully describe the technical contents of the present disclosure to make the technical content of the present disclosure clearer and easy to understand. However, the described embodiments are only some of the embodiments of the present disclosure, but not all of the embodiments. All other embodiments obtained by those skilled in the art based on the embodiments of the present disclosure without creative efforts are within the scope of the present disclosure.

Figure 2:
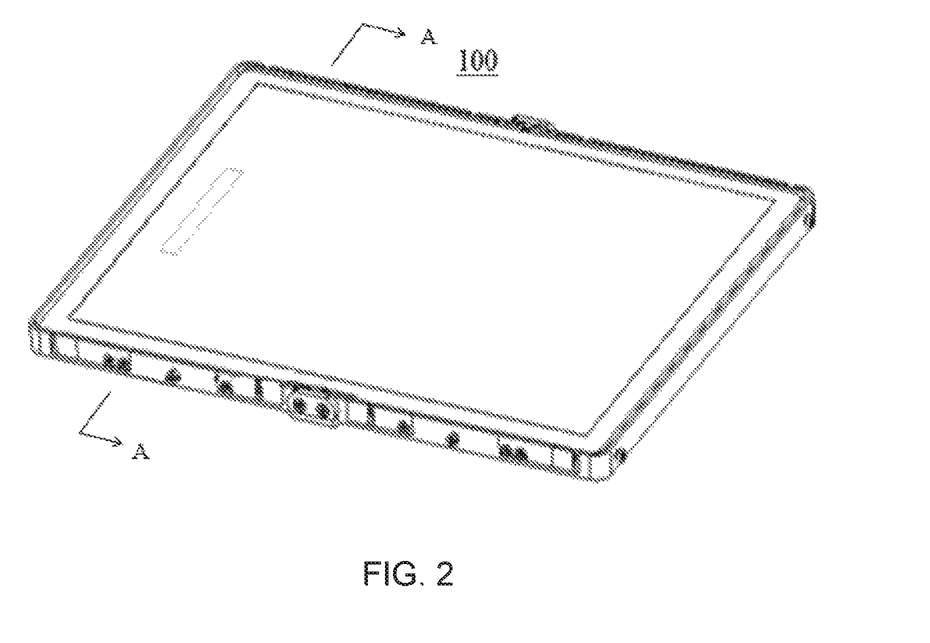
FIG. 2 is a schematic perspective view showing a foldable display device in an expanded state according to the present disclosure.
Figure 3:
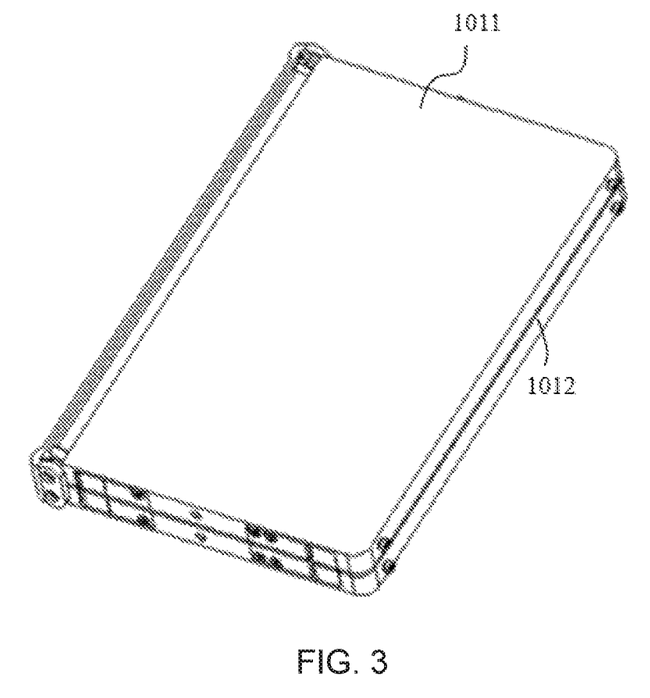
FIG. 3 is a schematic perspective view showing the foldable display device in FIG. 2 in a folded state.
Figure 4:
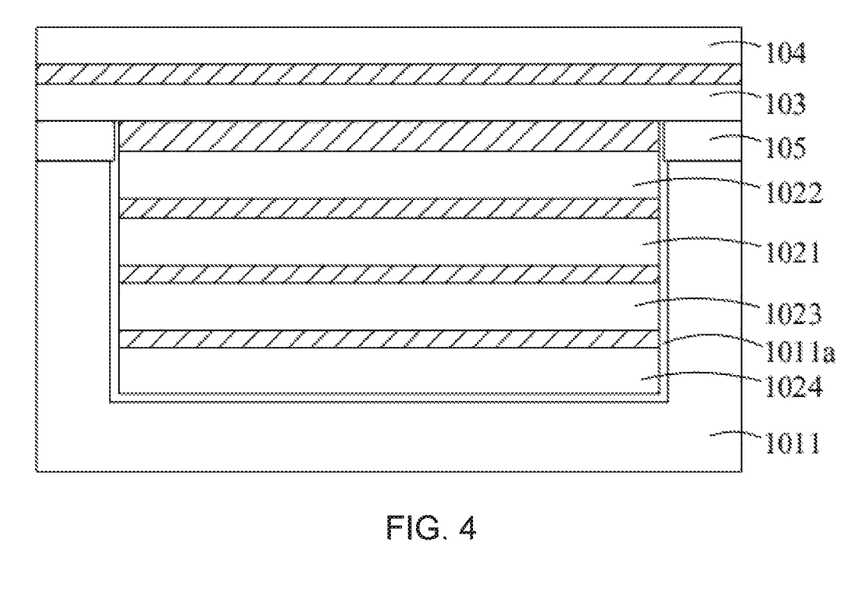
FIG. 4 is a schematic sectional view showing the foldable display device in FIG. 2 taken along a cutting line A-A.
Figure 5:
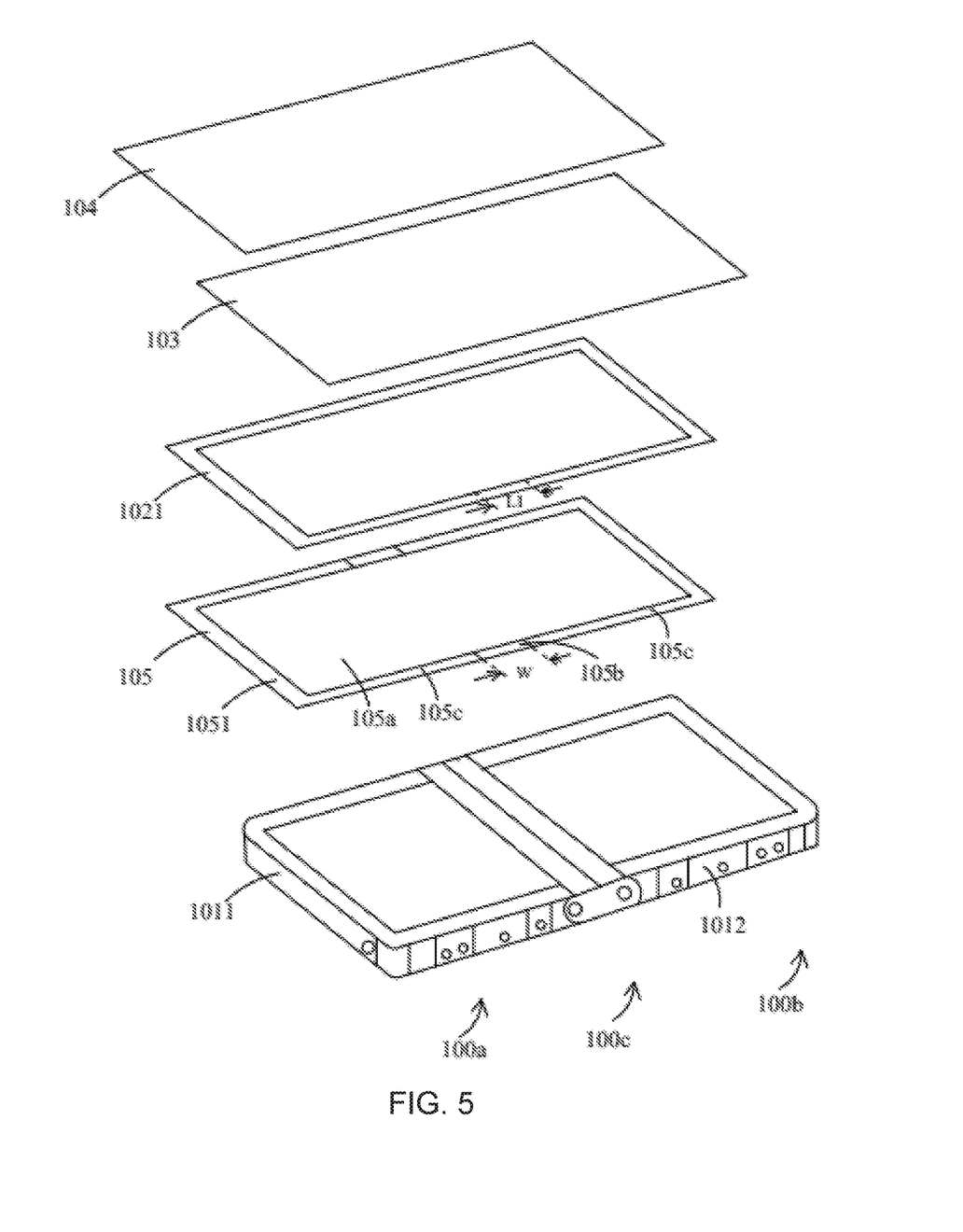
FIG. 5 is a schematic exploded view showing the foldable display device in FIG. 2, wherein FIG. 5 omits a polarizer and a rear cover plate in FIG. 4.

Please refer to FIG. 2 to FIG. 5. FIG. 2 is a schematic perspective view showing a foldable display device in an expanded state according to the present disclosure. FIG. 3 is a schematic perspective view showing the foldable display device in FIG. 2 in a folded state. FIG. 4 is a schematic sectional view showing the foldable display device in FIG. 2 taken along a cutting line A-A. FIG. 5 is a schematic exploded view showing the foldable display device in FIG. 2.

A foldable display device 100 includes a first housing 1011, a second housing 1012, a flexible display module, a rigid foldable functional layer 103, a protective film 104, and a frame-shaped connecting component 105. The flexible display device 100 includes a first non-bending area 100a, a second non-bending area 100b, and a bending area 100c connected between the first non-bending area 100a and the second non-bending area 100b.

The first housing 1011 is disposed opposite to the second housing 1012, and the first housing 1011 is rotatably connected to the second housing 1012 by a hinge component. The first housing 1011 and the second housing 1012 rotate with respect to each other by the hinge component, thereby folding the foldable display device. Both the first housing 1011 and the second housing 1012 are middle frames.

The first housing 1011 is configured to support a portion of the flexible display module corresponding to the first non-bending area 100a, and the second housing 1012 is configured to support a portion of the flexible display module corresponding to the second non-bending area 100b. The first housing includes a bottom plate and three side plates sequentially connected to each other. The bottom plate and the three side plates form a containing chamber 1011a, and the portion of the flexible display module corresponding to the first non-bending area 100a is disposed in the containing chamber 1011a of the first housing 1011. The second housing 1012 includes a bottom plate and three side plates sequentially connected to each other. The bottom plate and the three side plates form a containing chamber, and the portion of the flexible display module corresponding to the second non-bending area 100b is disposed in the containing chamber of the second housing 1012. A portion of the flexible display module corresponding to the bending area 100c is connected between the portion of the flexible display module corresponding to the first non-bending area 100a and the portion of the flexible display module corresponding to the second non-bending area 100b. Compared with conventional technologies, the present disclosure can better protect the flexible display module because the flexible display module is disposed in the containing chamber of the first housing 1011 and the containing chamber of the second housing 1012.

A side of the flexible display module is disposed on the first housing 1011 and the second housing 1012. The flexible display module includes a flexible display panel 1021, a polarizer 1022, a rear cover plate 1023, and a buffer layer 1024. The buffer layer 1024, the rear cover plate 1023, the flexible display panel 1021, and the polarizer 1022, which are sequentially stacked.

The flexible display panel 1021 is configured to display images. The flexible display panel 1021 is a flexible organic light-emitting diode (OLED) display panel. The buffer layer 1024 has a buffer effect. A portion of the buffer layer 1024 corresponding to the first non-bending area 100a and a portion of the buffer layer 1024 corresponding to the second non-bending area 100b are respectively disposed on the bottom plate of the first housing 1011 and the bottom plate of the second housing 1012. The buffer layer 1024 is a foam layer. The rear plate 1023 is configured to protect a backside of a light-emitting surface of the flexible display panel 1021. The rear plate 1023 is connected to the buffer layer 1024 by an adhesive layer. The flexible display panel 1021 is connected to the rear cover plate 1023 by an adhesive layer. The polarizer 1022 is configured to increase ambient light transmittance, thereby increasing contrast of the flexible display panel 1021. The polarizer 1022 is connected to the flexible display panel 1021 by an adhesive layer.

The rigid foldable functional layer 103 is disposed on another side of the flexible display module. The rigid foldable functional layer 103 is configured to rigidly support the flexible display module, and can be a decorative component of the foldable display device 100. The rigid foldable functional layer 103 is transparent. A portion of the rigid foldable functional layer 103 corresponding to the first non-bending area 100a is connected to the first housing 1011, a portion of the rigid foldable functional layer 103 corresponding to the second non-bending area 100b is connected to the second housing 1012, and the rigid foldable functional layer 103 is disposed on a light-emitting side of the flexible display module.

A width of the rigid foldable functional layer 103 is greater than a width of the flexible display module, and a length of the rigid foldable functional layer 103 is greater than a length of the flexible display module. Therefore, the rigid foldable functional layer 103 can rigidly support the entire flexible display module, and portions of the rigid foldable functional layer 103 protrude from the flexible display module can be attached to the first housing 1011 and the second housing 1012.

The rigid foldable functional layer 103 has good rigidity and is bendable. The rigid foldable functional layer 103 is an extremely thin glass. A material of the extremely thin glass is inorganic transparent glass. A thickness of the extremely thin glass ranges from 10 μm to 300 μm. The thickness of the extremely thin glass may also range from 20 μm to 300 μm. For example, the thickness of the extremely thin glass may be 30 μm, 40 μm, 50 μm, 60 μm, 70 μm, or 100 μm. A Young's modulus of the rigid foldable functional layer 103 ranges from 50 GPa to 100 GPa. For example, the Young's modulus of the rigid foldable functional layer 103 may be 60 GPa, 70 GPa, or 80 GPa, thereby strengthening the rigid foldable functional layer 103 and making the rigid foldable functional layer 103 have improved mechanical property. A hardness of the rigid foldable functional layer 103 ranges from 5 GPa to 15 GPa. For example, the hardness of the rigid foldable functional layer 103 may be 6 GPa, 8 GPa, or 10 GPa, thereby making the rigid foldable functional layer 103 have high surface hardness and good friction resistance, and improving scratch resistance of the foldable display device. Wherein, the hardness is measured by indentation method.

In addition, in the present disclosure, a linear thermal expansion coefficient of the extremely thin glass ranges from 7.0 ppm/° C. to 10.0 ppm/° C. at a temperature ranging from 20° C. to 300° C. For example, the linear thermal expansion coefficient of the extremely thin glass is 8 ppm/° C. A glass transition temperature of the extremely thin glass ranges from 550° C. to 650° C. For example, the glass transition temperature of the extremely thin glass is 600° C. A roughness of the extremely thin glass is less than 0.5 nm. For example, the roughness of the extremely thin glass is 0.001 nm. An optical elastic coefficient of the extremely thin glass ranges from 15 nm/cm/MPa to 40 nm/cm/MPa. For example, the optical elastic coefficient of the extremely thin glass is 25 nm/cm/M Pa.

Compared with conventional technologies (a support plate is disposed on a first housing and a second housing to rigidly support a flexible display module in a non-bending area, which causes a height difference), in the present disclosure, the support plate is omitted, so that the entire display module can have a narrowed size and can be contained in the containing chamber of the first housing 1011 and the containing chamber of the second housing 1012. The entire surface of the rigid foldable functional layer 103 rigidly supports the flexible display module, thereby preventing a height difference. Furthermore, the front frame is omitted, and the rigid foldable functional layer 103 can be a decorative component, thereby further preventing a height difference. Therefore, when the foldable display device is bent, its flatness can be ensured.

When the rigid foldable functional layer 103 is the extremely thin glass, the frame-shaped connecting component 105 is configured to connect the rigid foldable functional layer 103 to the first housing 1011 and the second housing 1012. Therefore, the rigid foldable functional layer 103 will not be too thin and too weak to be well attached to the first housing 1011 and the second housing 1012, and cracks will not appear on the rigid foldable functional layer 103. The frame-shaped connecting component 105 is configured to attach the rigid foldable functional layer 103 to the first housing 1011 and the second housing 1012, thereby facilitating easy changing or repairing of the flexible display module. High rigidity of the frame-shaped connecting component 105 can prevent breakage of an outer frame of the rigid foldable functional layer 103 connected to the frame-shaped connecting component 105 due to applied force.

A surface of the frame-shaped part 1051 is connected to the first housing 1011 and the second housing 1012, and another surface of the frame-shaped part 1051 is connected to the rigid foldable functional layer 103. An adhesive is coated on a surface of the frame-shaped connecting component 105 near the rigid foldable functional layer 103. The frame-shaped connecting component 105 is connected to the first housing 1011 and the second housing 1012 by an adhesive layer.

A portion of the rigid foldable functional layer 103 corresponding to the flexible display module is connected to the flexible display module by an optically clear adhesive (OCA) layer, thereby enabling the rigid foldable functional layer 103 and the flexible display module to be bent simultaneously, and preventing uneven flatness caused by height difference due to a gap appearing between the rigid foldable functional layer 103 and the flexible display module. Specifically, the portion of the rigid foldable functional layer 103 corresponding to the flexible display module is connected to the polarizer 1022 by the OCA layer.

When the foldable display device 100 is in the expanded state, a surface of the OCA layer, which connects to the flexible display module and rigid foldable functional layer 103 and is near the rigid foldable functional layer 103, and a surface of the frame-shaped connecting component 105, which is near the rigid foldable functional layer 103, are in a same plane, thereby ensuring that a portion of the rigid foldable functional layer 103 connecting to the frame-shaped connecting component 105 and a portion of the rigid foldable functional layer 103 connecting to the flexible display module can in a same plane. Therefore, flatness of the rigid foldable functional layer 103 can be increased, thereby increasing flatness of the foldable display device.

The frame-shaped connecting component 105 includes the frame-shaped part 1051 and an opening 105a defined in the frame-shaped part. the frame-shaped connecting component 105 is rectangle, and the opening 105a is also rectangle. The opening 105a of the frame-shaped connecting component 105 corresponds to the flexible display module. A size of the opening 105a is greater than or equal to a size of the flexible display module, thereby preventing light emitted from the flexible display panel 1021 of the flexible display module from being blocked by the frame-shaped connecting component 105. The frame-shaped connecting component 105 is a frame of the flexible display module.

A width of the frame-shaped part 1051 of the frame-shaped connecting component 105 is equal to one half of a difference between a width of the rigid foldable functional layer 103 and a width of the flexible display module, thereby easily mounting the flexible display module on the first housing 1011 and the second housing 1012.

The width of the frame-shaped part 1051 of the frame-shaped connecting component 105 is greater than or equal to a width of the side plate of the first housing 1011 and a width of the side plate of the second housing 1012, thereby maximizing a connecting area between the frame-shaped connecting component 105, and the first housing 1011 and the second housing 1012. Therefore, the frame-shaped connecting component 105, and the first housing 1011 and the second housing 1012 can be better connected to each other, thereby reducing a risk of separation between the frame-shaped connecting component 105, and the first housing 1011 and the second housing 1012. Specifically, as shown in FIG. 4, the width of the frame-shaped part 1051 of the frame-shaped connecting component 105 is greater than the width of the side plate of the first housing 1011 and the width of the side plate of the second housing 1012.

An outer edge of the frame-shaped connecting component 105 is aligned with an outer edge of the rigid foldable functional layer 103, an outer edge of the first housing 1011, and an outer edge of the second housing 1012. As a result, an edge of the foldable display device 100 can be more aesthetically pleasing, and people using terminals can have better user experience.

When the rigid foldable functional layer 103 is the extremely thin glass, the protective film 104 not only can prevent an explosion of the rigid foldable functional layer 103, but also can be a protective screen that is easy to be disassembled. The protective film 104 is disposed on a side of the rigid foldable functional layer 103 away from the flexible display module, and a thickness of the protective film 104 ranges from 5 μm to 30 μm. Compared with conventional polyimide cover plates, the protective film 104 of the present disclosure is thinned, thereby preventing apparent folds from appearing when the protective film 104 is bent. The thickness of the protective film 104 may also range from 10 μm to 25 μm. For example, the thickness of the protective film 104 is 15 μm, 18 μm, or 20 μm. A material of the protective film is at least one of polyimide or polyethylene terephthalate.

The frame-shaped component 105 includes a first area 105b and a plurality of second areas 105c, the first area 105b of the frame-shaped component 105 corresponds to the bending area 100c, and the second area 105c of the frame-shaped connecting component 105 corresponds to the first non-bending area 100a and the second non-bending area 100b. The first area 105b is disposed between two second areas 105c. Portions of the frame-shaped connecting component 105 corresponding to the second areas 105c are attached to the first housing 1011 and the second housing 1012. An elastic modulus of the frame-shaped connecting component 105 in the first area 105b is less than an elastic modulus of the frame-shaped connecting component 105 in the second area 105c, thereby enabling rigidity of the portion of the frame-shaped connecting component 105 corresponding to the first non-bending area 100a, the portion of the frame-shaped connecting component 105 corresponding to the second non-bending area 100b, the first housing 1011, the second housing 1012, and the rigid foldable functional layer 103 to match with each other. Furthermore, the portion of the frame-shaped connecting component 105 corresponding to the bending area 100c can be ensured to have relatively high ductility. Therefore, the foldable display device can extend and restore easily when being bent.

A plurality of recesses 105d, which are spaced apart from each other and are alternately arranged, are defined on the frame-shaped connecting component 105 in the first area 105b, thereby making the elastic modulus of the frame-shaped connecting component 105 in the first area 105b less than the elastic modulus of the frame-shaped connecting component 105 in the second area 105c. The elastic modulus of the frame-shaped connecting component 105 in the first area 105b ranges from 1 MPa to 100 MPa. For example, the elastic modulus of the frame-shaped connecting component 105 in the first area 105b is 5 MPa, 10 MPa, 30 MPa, 50 MPa, or 85 MPa. The elastic modulus of the frame-shaped connecting component 105 in the second area 105c is greater than 150 GPa. For example, the elastic modulus of the frame-shaped connecting component 105 in the second area 105c is 190 GPa or 200 GPa.

A material of the frame-shaped connecting component 105 is at least one of stainless steel, an amorphous material, a nickel-copper alloy, or an aluminum alloy. Specifically, the material of the frame-shaped connecting component 105 is the stainless steel, thereby allowing the frame-shaped connecting component 105 to have good rigidity and great bendability.

Figure 7:
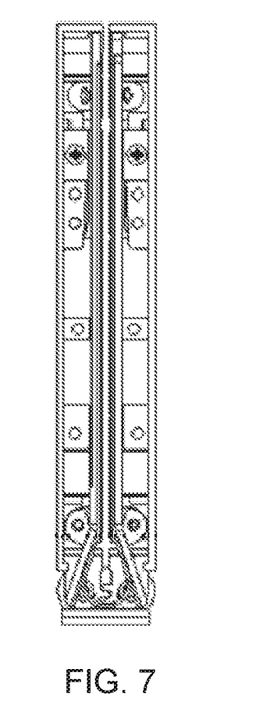
FIG. 7 is a schematic sectional view showing the folded-state foldable display device in FIG. 3, wherein a foldable display module is bent to be water-drop shaped.
Figure 8:
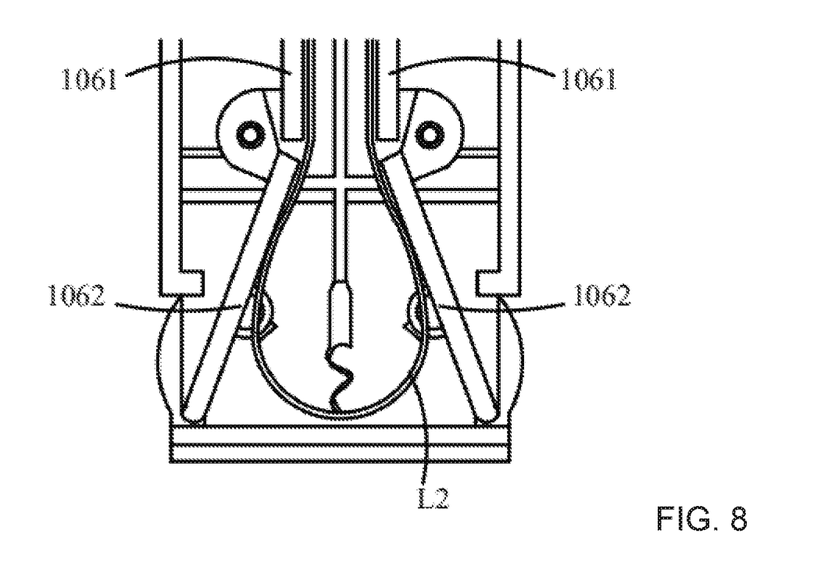
FIG. 8 is a schematic enlarged view showing the folded-state foldable display device in FIG. 7.

As shown in FIG. 5, when the foldable display device 100 is in the expanded state, the frame-shaped connecting component 105 is in the expanded state, a length of the frame-shaped connecting component 105 in the first area 105b is W, a length of the portion of the flexible display module corresponding to the bending area 100c is L1, and the length W of the frame-shaped connecting component in the first area 105b is greater than the length L1 of the portion of the flexible display module corresponding to the bending area 100c. When the foldable display device is completely bent, a length of the portion of the flexible display module corresponding to the bending area 100c is L2. For example, when the flexible display module is bent to be water-drop shaped as shown in FIG. 7 and FIG. 8, the length L2 of the portion of the flexible display module corresponding to the bending area 100c is greater than the length W of the frame-shaped connecting component 105 in the first area 105b. FIG. 7 is a schematic sectional view showing the folded-state foldable display device in FIG. 3. FIG. 8 is a schematic enlarged view showing the folded-state foldable display device in FIG. 7. The foldable display device as shown in FIG. 7 includes a plurality of first support plates 1061 and a plurality of second support plates 1062 which are disposed in the containing chamber of the first housing 1011 and the containing chamber of the second housing 1012. When the foldable display device is completely bent, the first support plate 1061 in the first housing 1011 supports the portion of the flexible display module corresponding to the first non-bending area, the first support plate 1061 in the second housing plate 1061 corresponds to the first non-bending area, and the second support plate 1062 in the first housing 1011 and the second support plate 1062 in the second housing 1012 are attached to the portion of the flexible display module corresponding to the bending area, thereby allowing the portion of the flexible display module corresponding to the bending area to smoothly be water-drop shaped.

Figure 6A:
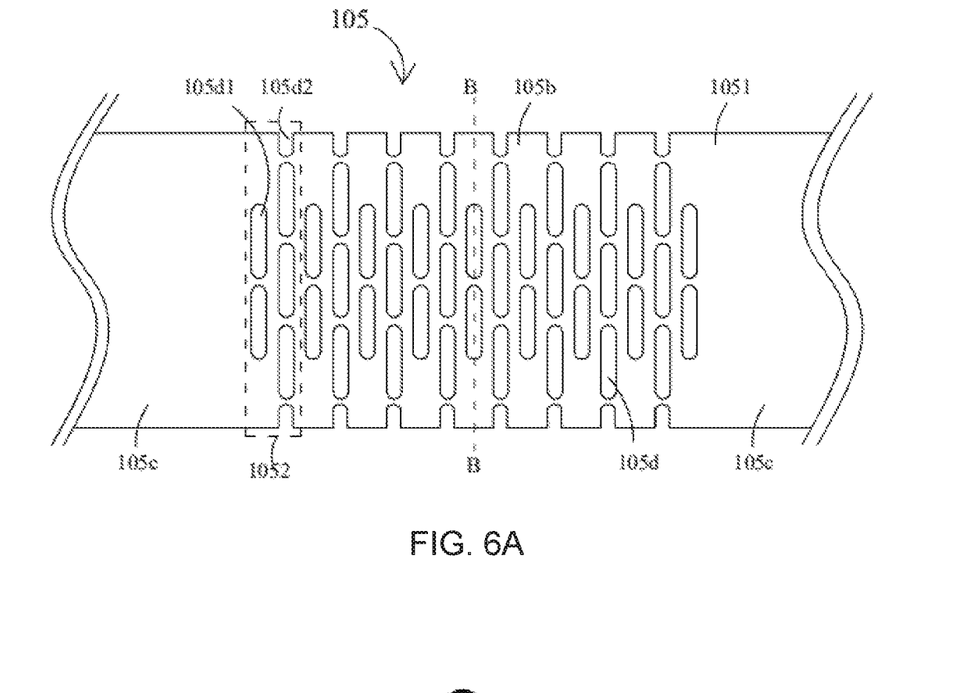
FIG. 6A is a first schematic enlarged view showing a frame-shaped connecting component in FIG. 5.

As shown in FIG. 6A, a first schematic enlarged view showing the frame-shaped connecting component in FIG. 5 is provided. The plurality of recesses 105d, which are spaced apart from each other and are alternately distributed, are defined on the frame-shaped connecting component 105 in the first area 105b. The recesses 105d include a plurality of first recesses 105d1 and a plurality of second recesses 105d2. The second recesses 105d2 are defined at two opposite edges of the frame-shaped connecting component 105 in the first area 105b, the first recesses 105d1 are defined between the two opposite edges of the frame-shaped connecting component 105 in the first area 105b, and the two opposite edges extend along a width direction of the frame-shaped connecting component 105. A depth of the recesses is equal to a thickness of the frame-shaped connecting component. A depth of the first recesses 105d1 and a depth of the second recesses 105d2 are equal to a thickness of the frame-shaped connecting component 105.

The recesses 105d, which are spaced apart from each other and alternately distributed, are symmetrically disposed with respect to a bending central axis B-B of the foldable display device 100. The recesses 105d, which are spaced apart from each other and alternately distributed, include a plurality of repeating units 1052. The repeating units 1052 are evenly and repeatedly arranged along a length direction of the frame-shaped connecting component 105, and distances between two adjacent repeating units 1052 are equal.

Each of the repeating units 1052 further includes the first recesses 105d1 arranged along the length direction of the frame-shaped connecting component 105 in a first column and the first recesses 105d1 arranged along the length direction of the frame-shaped connecting component 105 in a second column. A number of the first recesses 105d1 in the first column is less than a number of the first recesses 105d1 in the second column. The recesses 105d1 in the second column are disposed near the bending central axis B-B. The first recesses 105d1 in the first column and the first recesses 105d1 in the second column are alternately disposed. A distance between two adjacent recesses 105d1 in the same column ranges from 0.1 mm to 0.3 mm. For example, the distance between two adjacent recesses 105d1 in the same column is 0.15 mm or 0.2 mm. A distance between two adjacent recesses 1051d1 along the length direction of the frame-shaped connecting component 105 ranges from 0.05 mm to 0.015 mm. For example, the distance between two adjacent recesses 1051d1 along the length direction of the frame-shaped connecting component 105 is 0.08 mm, 0.1 mm, or 0.12 mm.

Each of the repeating units 1052 further includes two second recesses 105d2 which are defined in the second column as the first recesses 105d1 and are defined on two opposite edges of the frame-shaped connecting component 105. The second recesses 105d2 are U-shaped, and an opening of the U-shaped second recesses 105d2 is away from the first recesses 105d1.

Figure 6B:
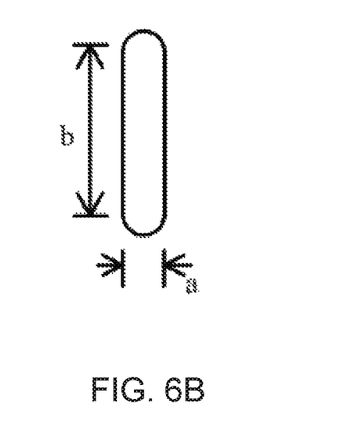
FIG. 6B is a schematic view showing a first recess in FIG. 6A.

As shown in FIG. 6B, a schematic view showing the first recess in FIG. 6A is provided. A size of the recesses 105d1 along the width direction of the frame-shaped part 1051 of the frame-shaped connecting component 105 is greater than a size of the recesses 105d1 along the length direction of the frame-shaped part 1051 of the frame-shaped connecting component 105. The first recesses 105d1 are rod-shaped. A sectional surface of the first recesses 105d1 includes two opposite straight lines parallel to each other and two opposite curved lines connecting to the two opposite straight lines. A length b of the two opposite straight lines ranges from 1 mm to 10 mm. For example, the length b of the two opposite straight lines is 2 mm, 4 mm, 5 mm, or 8 mm. A distance between the two opposite straight lines ranges from 0.1 mm to 0.5 mm. For example, the distance between the two opposite straight lines is 0.2 mm, 0.4 mm, or 0.6 mm. When the foldable display device 100 is bent, a shape of the first recesses 105d1 is changed due to stretch.

Figure 6C:
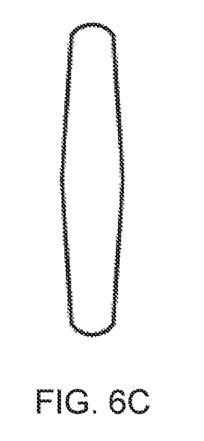
FIG. 6C is a schematic planar view showing another first recess according to an embodiment of the present disclosure.

As shown in FIG. 6C, a schematic planar view showing another first recess according to an embodiment of the present disclosure is provided. The first recesses 1051d as shown in FIG. 6C is diamond-shaped. A sectional surface of the first recesses 1051 includes a first inclined straight line, a second inclined straight line, a third inclined straight line, a fourth inclined straight line, a first circular arc, and a second circular arc. The first inclined straight line is connected to the second inclined straight line, and the third inclined straight line is connected to the fourth inclined straight line. The first inclined straight line and the third inclined straight line are opposite to each other and are connected to each other by the first circular arc, the second inclined straight line and the fourth inclined straight line opposite to each other and are connected to each other by the second circular arc. The first inclined straight line and the second inclined straight line may also be connected to each other by a circular arc, and the third inclined straight line and the fourth inclined straight lines may also be connected to each other by a circular arc.

In other embodiment, a depth of the recesses is less than a thickness of the frame-shaped connecting component. When the depth of the first recesses 105d1 is less than the thickness of the frame-shaped connecting component 105, an elastic rubber is filled in the first recesses 105d1. The elastic rubber may be a silicon rubber, thereby improving ductility of the frame-shaped connecting component 105 in the first area 105b. The depth of the first recesses 105d1 may also be increasingly decreased along a direction from the first area 105b to the second area 105c. When the elastic rubber is the silicon rubber, an elongation ratio of the silicon rubber must reach at least 50%. Before the silicon rubber is cured, it is in a liquid state and has good fluidity. Therefore, the silicon rubber is easy to be fully filled in the first recesses 105d1 during silkscreen printing due to its high elasticity and elongation ratio, and then a thin layer of the silicon rubber is formed on a surface of the frame-shaped connecting component 105. The frame-shaped connecting component 105 can be moved along with other layers during a bending process. Therefore, an alignment error can be significantly reduced, and a stripping problem will not happen. By filling the silicon rubber with high elasticity, the first area 105b of the frame-shaped connecting component 105 can recover well after being bent. Therefore, folds caused by bend and waviness in the middle portion are difficult to be observed, and appearance will not be badly affected.

Figure 6D:
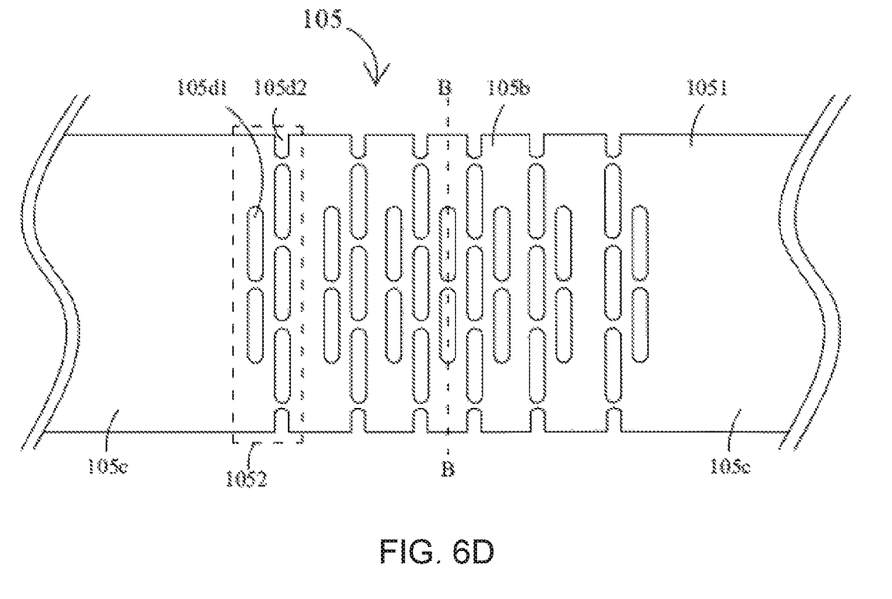
FIG. 6D is a second schematic enlarged view showing the frame-shaped connecting component in FIG. 5.

As shown in FIG. 6D, a second schematic enlarged view showing the frame-shaped connecting component in FIG. 5 is provided. The frame-shaped connecting component as shown in FIG. 6D and the frame-shaped connecting component as shown in FIG. 6A are basically similar. A difference between them is: the distance between two adjacent repeating units 1052 is progressively increased along the direction from the first area 105b to the second area 105c. Therefore, the elastic modulus of the frame-shaped connecting component 105 is progressively increased along the direction from the first area 105b to the second area 105c.

It should be noted that multiple sections of the recesses 105d can be defined on the frame-shaped connecting component 105 along the length direction of the frame-shaped connecting component 105. In different sections, distances between adjacent recesses 105d are different, a size, a depth, and a density of the recesses 105d are different, and the above parameters can be determined according to a folded state of the flexible display module. The folded state of the flexible display module includes U-shaped bending, wedge-shaped bending, or water-drop shaped bending. For example, the recesses 105d distributed in an area of the flexible display module having large deformation are relatively dense, which is beneficial for increasing an elongation ratio and improving elasticity.

The description of the above embodiments is only for helping to understand the technical solution of the present disclosure and core ideas thereof, and it is understood by those skilled in the art that many changes and modifications to the described embodiment can be carried out without departing from the scope and the spirit of the disclosure that is intended to be limited only by the appended claims.

What is claimed is:

1. A foldable display device, comprising:
a first housing, a second housing rotatably connected to the first housing, a flexible display module, and a rigid foldable functional layer;
wherein a side of the flexible display module is disposed on the first housing and the second housing, and the rigid foldable functional layer is disposed on another side, which is a light-emitting side, of the flexible display module; and
wherein a portion of the rigid foldable functional layer corresponding to the flexible display module is connected to the flexible display module by an optically clear adhesive layer, a width of the rigid foldable functional layer is greater than a width of the flexible display module, and a length of the rigid foldable functional layer is greater than a length of the flexible display module.

2. The foldable display device of claim 1, wherein the rigid foldable functional layer is an extremely thin glass with a thickness ranging from 10 µm to 300 µm.

3. The foldable display device of claim 1, wherein the foldable display device comprises a first non-bending area, a second non-bending area, and a bending area connected between the first non-bending area and the second non-bending area, the first housing and the second housing each comprise a containing chamber, a portion of the flexible display module corresponding to the first non-bending area is disposed in the containing chamber of the first housing, a portion of the flexible display module corresponding to the second non-bending area is disposed in the containing chamber of the second housing, and a portion of the flexible display module corresponding to the bending area is connected between the portion of the flexible display module corresponding to the first non-bending area and the portion of the flexible display module corresponding to the second non-bending area.

4. The foldable display device of claim 1, wherein the foldable display device further comprises a frame-shaped connecting component comprising a frame-shaped part and an opening defined in the frame-shaped part, a surface of the frame-shaped part is connected to the first housing and the second housing, another surface of the frame-shaped part is connected to the rigid foldable functional layer, the opening of the frame-shaped connecting component corresponds to the flexible display module, and the surface of the frame-shaped part is opposite to another surface of the frame-shaped part.

5. The foldable display device of claim 4, wherein the foldable display device comprises a first non-bending area, a second non-bending area, and a bending area disposed between the first non-bending area and the second non-bending area, the frame-shaped connecting component comprises a first area and a second area, the first area of the frame-shaped connecting component corresponds to the bending area, the second area of the frame-shaped connecting component corresponds to the first non-bending area and the second non-bending area, a portion of the frame-shaped connecting component corresponding to the second area is attached to the first housing and the second housing, and an elastic modulus of the frame-shaped connecting component in the first area is less than an elastic modulus of the frame-shaped connecting component in the second area.

6. The foldable display device of claim 5, wherein the elastic modulus of the frame-shaped connecting component in the first area ranges from 1 MPa to 100 MPa, and the elastic modulus of the frame-shaped connecting component in the second area is greater than 150 GPa.

7. The foldable display device of claim 5, wherein a plurality of recesses, which are spaced apart from each other and are alternately arranged, are defined on the first frame-shaped connecting component in the first area.

8. The foldable display device of claim 7, wherein the recesses, which are spaced apart from each other and are alternately arranged, are symmetrically disposed with respect to a bending central axis of the foldable display device, and a size of each of the recesses along a width direction of the frame-shaped part of the frame-shaped connecting component is greater than a size of each of same recesses along a length direction of the frame-shaped part of the frame-shaped connecting component.

9. The foldable display device of claim 7, wherein a depth of the recesses is less than or equal to a thickness of the frame-shaped connecting component.

10. The foldable display device of claim 7, wherein a depth of the recesses is less than a thickness of the frame-shaped connecting component, and an elastic rubber is filled in the recesses.

11. The foldable display device of claim 4, wherein a width of the frame-shaped part of the frame-shaped connecting component is equal to one half of a difference between a width of the rigid foldable functional layer and a width of the flexible display module, and the width of the rigid foldable functional layer is greater than the width of the flexible display module.

12. The foldable display device of claim 4, wherein an outer edge of the frame-shaped connecting component is aligned with an outer edge of the rigid foldable functional layer, an outer edge of the first housing, and an outer edge of the second housing.

13. The foldable display device of claim 4, wherein a material of the frame-shaped connecting component comprises at least one of stainless steel, an amorphous material, a nickel-copper alloy, or an aluminum alloy.

14. The foldable display device of claim 4, wherein a size of the opening is greater than or equal to a size of the flexible display module.

15. The foldable display device of claim 4, wherein a width of the frame-shaped connecting component is greater than or equal to a width of a side plate of the first housing and a width of a side plate of the second housing.

16. The foldable display device of claim 1, wherein the foldable display device further comprises a protective film disposed on a side of the rigid foldable functional layer away from the flexible display module, and a thickness of the protective film ranges from 5 μm to 30 μm.

17. The foldable display device of claim 16, wherein a material of the protective film comprises at least one of polyimide or polyethylene terephthalate.

18. The foldable display device of claim 16, wherein the thickness of the protective film ranges from 10 μm to 25 μm.

19. The foldable display device of claim 1, wherein a Young's modulus of the rigid foldable functional layer ranges from 50 GPa to 100 GPa, and a hardness of the rigid foldable functional layer ranges from 5 GPa to 15 GPa.

20. The foldable display device of claim 1, further comprising a protective film independently disposed on a side of the rigid foldable functional layer away from the flexible display module, wherein the rigid foldable functional layer is an extremely thin glass, and a material of the protective film comprises at least one of polyimide or polyethylene terephthalate.

* * * * *